INTERFACE RESISTANCE MONITOR

Filed May 31, 1966 4 Sheets-Sheet 1

INVENTOR
PAUL A. TOTTA
BY John F. Ohlandt, Jr.
ATTORNEY

INTERFACE RESISTANCE MONITOR

Filed May 31, 1966 4 Sheets-Sheet 3

United States Patent Office 3,388,457

Patented June 18, 1968

3,388,457

INTERFACE RESISTANCE MONITOR

Paul A. Totta, Poughkeepsie, N.Y., assignor to International Business Machines Corporation, Armonk, N.Y., a corporation of New York Filed May 31, 1966, Ser. No. 553,900

14 Claims. (Cl. 29—574)

This invention relates to semiconductor device and circuit manufacture and more particularly, to a branch thereof known as integrated circuit fabrication.

Integrated circuitry, as that term is understood in the art covers a variety of techniques for fabricating in a continuous series of operations complete circuit configurations comprising active and passive devices. Regardless of the particular techniques that are employed in producing the interconnected multiplicity of devices, the miniscule regions which define the individual semiconductor devices are usually formed by means of the diffusion technology.

The new knowledge gained in the development of integrated circuitry has led to the reformulation of the basic design philosophy governing circuit manufacture. Thus, rather than the focus of attention being on the individual device parameters, attention has shifted dramatically to the possibilities of higher yield thereby leading to cost reduction. In essence, then, the design philosophy has tended to become more concerned with the economics of total performance, with less emphasis on the strict device tolerances previously adhered to.

As an example of this new design approach a typical circuit, such as a full adder, would, in the conventional discrete-component design, be laid out having minimum number of components. The integrated circuit viewpoint would generally call for a far greater number of devices for accomplishing the identical circuit function such that the tolerances on the individual devices could be greatly liberalized. However, the integrated design would seek to accomplish the design objective with a minimum number of processing steps and with the most reliable kind of processing such that, despite the greater number of devices that would be involved in the circuit function, the yield for that overall design would be much higher and consequently would be achieved with much lowered cost.

In fulfilling this requirement for higher yield it is of paramount importance to be able to control the process parameters and effectively to monitor continuously the steps as they are being performed, particularly at the initial stages of the process.

One of the major difficulties which attends the attempt to obtain greater yield in integrated circuit manufacture is the factor of contact resistance, or interface resistance, which exists at the points of joinder of metal conductors, or such resistance as it appears at a metal to semiconductor interface. Unless this interface resistance is closely monitored it will normally be masked out in the various conventional tests that are performed on the devices in the integrated circuit assembly. An important aspect then of knowing the "via" hole resistance is to supply the device designer with engineering data so that he may include via hole or contact hole resistance in his circuit design.

Without close monitoring the devices when tested would normally meet the imposed criteria; however, it will be found later that when the entire integrated circuit assembly is subjected to stress, such as by temperature and humidity tests, the assembly will fail due to the fact that the interface resistance was not properly monitored. The existence of too high an interface resistance may be ascribed to a number of causes. One of these, for example, is the fact that the so-called "via" holes have not been properly formed (i.e. incompletely opened, or later contaminted). These "via" holes are formed through the insulator for inter-connecting several levels of metal conductors. Another reason is that the evaporation procedure was not good enough (or the process went out of control, unknowingly).

Accordingly, it is the fundamental object of the present invention to monitor thoroughly the preparation of integrated circuits.

Another object is to provide a control technique that will be incorporated into the process of integrated circuit manufacture.

Another object is to provide for the monitoring of interface resistance in the initial stages of the fabrication of integrated circuits so as to insure that only those substrates that meet strict requirements will continue on to further processing steps.

Although in the description which follows of the several embodiments of the present invention there will be provided a great number of details with respect to the semiconductor materials that are to be utilized, the oxides, and the various metals that are used in forming the electrical leads or conductors, it should be borne in mind that the technique of the present invention is a completely general one applicable to a wide variety of conditions and types of materials.

A broad feature of the present invention resides, briefly stated, in the provision of the formation of a test specimen, or test device, for the monitoring of the process parameters in integrated circuit manufacture to insure proper interface resistance. Another broad feature is the technique of creating the test device under the identical conditions for producing the integrated devices. It is a specific feature of the present invention that a test specimen for producing for the testing of interface resistance is formed in an L-L configuration and, in one embodiment, at two different metallurgy levels of the semiconductor assembly. This testing means, that is used as a control tool, is fabricated, preferably simultaneously, with the fabrication of the multitude of devices that will be interconnected into the desired circuit patterns. In the particular type of integrated circuit process with which the present technique is uniquely adapted to be exploited, the test specimen is formed in its own unique pattern as a unit of what has come to be known as "chips," that is, portions of an integral semiconductor wafer each of which is designed to have its own self-contained function and which is later separated from the wafer to be placed into its final circuit arrangement on a circuit board or module.

By virtue of the formation of the test specimen which is used to monitor the interface resistance one is able to find out at the outset whether a given substrate should be discarded. Thus, if it is found that the interface resistance has not been reduced to a sufficiently low value for a given substrate, that substrate is not passed on for further processing.

The foregoing and other objects, features and advantages of the invention will be apparent from the following more particular description of preferred embodiments of the invention, as illustrated in the accompanying drawings.

Referring now to FIGS. 1–6, there is illustrated one embodiment of the technique of the present invention which is concerned with the measurement of interface resistance between metals. The context here is the metallurgy system for a 2-conductor level integrated circuit "chip." The test specimen asa monitoring means is used to evaluate, as particular examples, the interface resistance between thin films of Al, Al-3% Si, and Cr-Cu-Au, as these metals or alloys are applied as contacts, interconnections and crossovers in integrated circuits. The effects of processing steps such as an opening of holes in a quartz insulator, predeposition cleaning operations and sintering heat treatments are observed in terms of their effects on interface resistance and film resistivity.

Figures 1, 2:
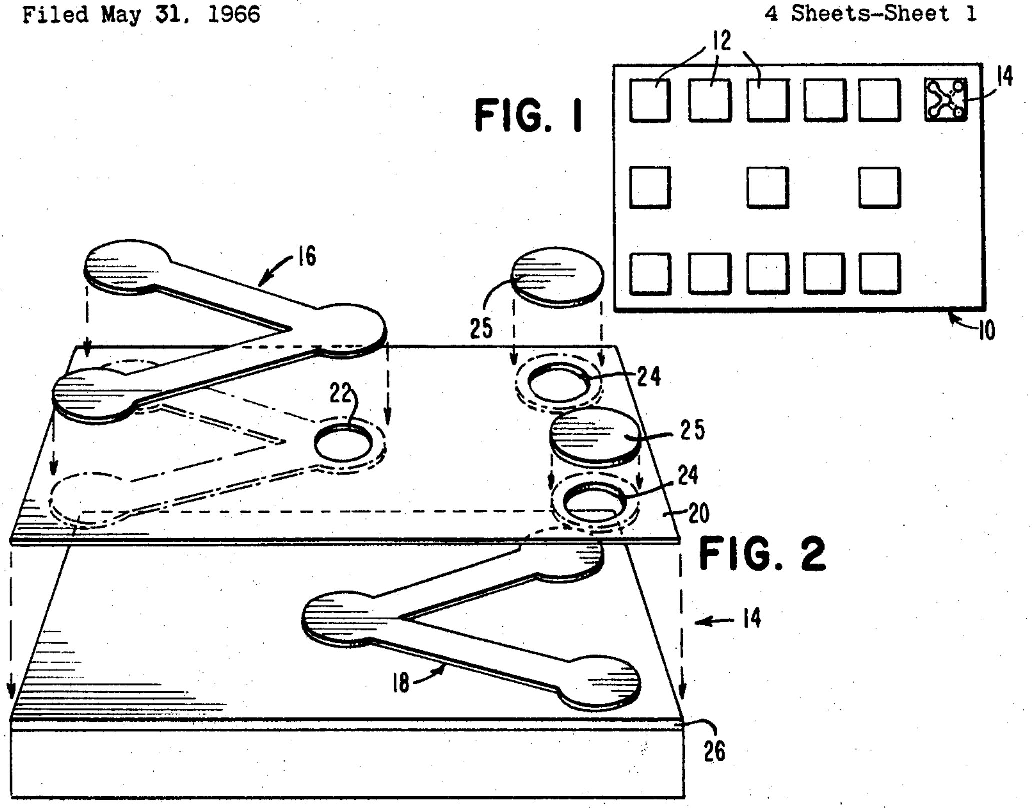
FIG. 1 is a top view of the device and test specimen pattern which has been formed on a portion of a semiconductor wafer.
FIG. 2 is an exploded view of the test specimen.

Referring now to FIG. 1, there is illustrated in a plan view a portion of substrate generally designated 10, having at its top surface a number of individual device units 12 and a test specimen 14.

What is being measured in this particular instance is the interface resistance at a "via" hole, that is, the resistance of the contact made between two different levels of metallurgy through a hole in an intermediate insulating layer. The top metal layer 16 of the test specimen 14 is in the general form of an L and is at the first level, that is, at the surface of the substrate 10. The second layer 18 is formed in another L at a second level of the substrate. Between the top layer 16 and the second layer 18 there is disposed a layer 20 of insulating material such as quartz. The "via" hole 22 in the layer 20 is the hole at which the top layer 16 contacts the lower layer 18, the resistance at this point of contact being the resistance to be measured. Auxiliary holes 24 are formed in the insulating layer so that probe contact can be made to the extremities of layer 18, typically by evaporating dots 25 of the same metal as layer 16 over the holes 24 for convenience in probing. The substrate for the depositing of the metallurgy and in particular of the L-L test specimen is, for example, a silicon wafer with a 6000 angstrom layer 26 of thermal oxide, such as $SiO_2$. Such substrates are those generally used with the conventional diffusion technology for producing integrated circuit devices, such technology, of course, being well-known to those skilled in the art.

As noted previously, the test specimen 14 is of unit size, that is, its is approximately the same size as the device units 12 which are to be proceessed into chips. These individual units are formed on 60 mil centers. Hence, several specimens like test specimen 14, are dispersed among hundreds of integrated circuits made at the same time on a single 1¼ inch diameter substrate. By virtue of the advanced photoresist techniques that have been developed for integrated circuit fabrication, such as the multiple exposure techniques with the fly's eye camera, the "via" holes that are formed, such as a hole 22 for the test specimen 14, can be of different sizes, in the range of from about .5 mil to 2.5 mils in diameter, depending on the devices being fabricated.

Figure 6:
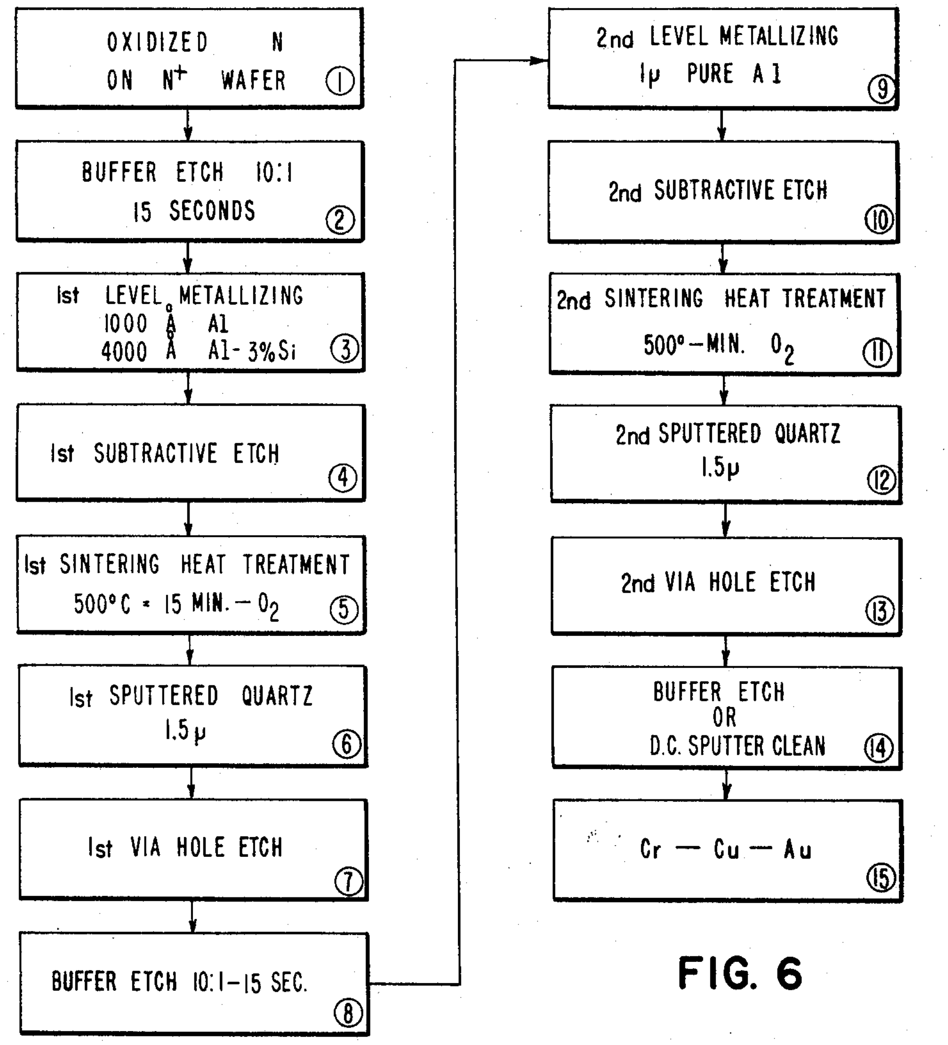
FIG. 6 is a diagram showing the steps performed in the process of making a typical test specimen.

For purposes of clarity and understanding of the role of the technique of the present invention, it might be helpful at this juncture to review the basic approaches to integrated circuit manufacture. These approaches generally involve multiple diffusion operations to create the extremely minute regions for the different active devices such as transisistors, diodes, etc. This is accomplished by a sequence of oxide layer formations and photoresist-etching operations. The oxide layers, of course, serve as diffusion masks for thte selective penetration of impurities. Finally, the desired circuit configurations which call for the interconnection of the many devices are completed. This is done either with devices remaining embedded as they have been formed, or they are removed to circuit boards whence they are interconnected to the required passive devices such as resistors, capacitors and the like by printed circuit techniques. However, as has been noted previously, it is of the greatest importance, before proceeding to the final stages as chosen in accordance with the design philosophy, to completely check out the wafer. It will be appreciated that the effectiveness in making contacts is established by the already formed test specimen 14, which permits a 4-point probe measurement of the interface resistance between the two metal layers 16 and 18 at the "via" hole which is the desired conductive passage through the quartz insulator. From the deposition of the first level metallurgy onward, the test specimen 14 experiences the same processing steps as an actual device wafer. These steps are shown in FIG. 6. It will be understood of course that the steps shown in detail in FIG. 6 are in no way restrictive or limitative with respect to the control technique of the present invention but have been provided as a backdrop for fully appreciating the significance of this technique.

Figure 3:
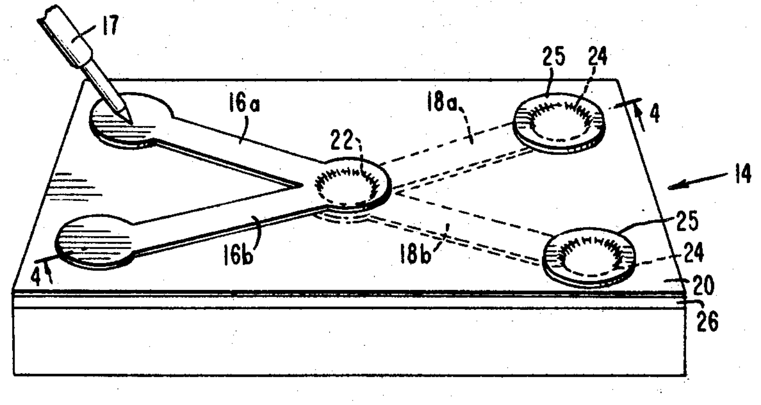
FIG. 3 is an enlarged perspective view of the test specimen.
Figure 4:
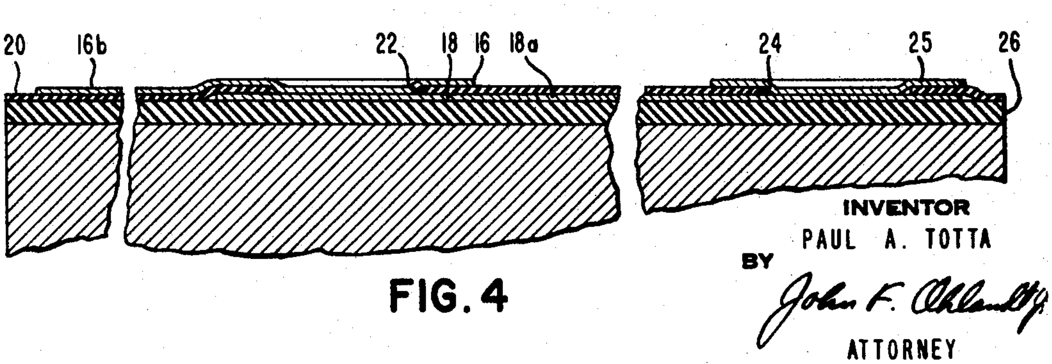
FIG. 4 is a sectional view, on the line 4—4 of the test speciment of FIG. 3.
Figure 5:
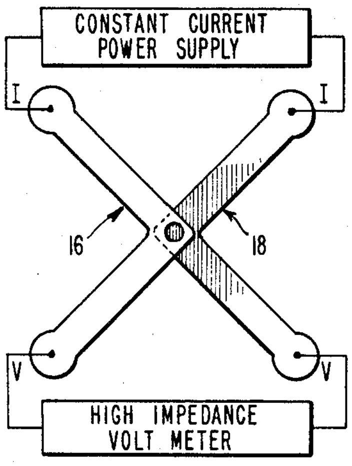
FIG. 5 is a schematic diagram of the circuit for testing the interface resistance.

Each of the metal layers 16 and 18, in the form of an L as shown, has a current leg, for example, **16*a* and 18*a*, respectively, and a voltage leg 16*b* and 18*b*, respectively, as best seen in FIG. 3. In testing to determine the interface resistance a constant current (DC) is supplied from the power supply through the leg 16*a* at one level, through the cross section of the "via" hole 22 and out the leg 18*a* at a second level. Probes, such as probe 17, are used for this purpose. Of course, the current could be supplied alternatively by way of leg 16*b* and thence through either of legs 18*a* or 18*b*, the only requirement being that the current pass from a leg at one level to the next level. The IR drop across the "via" hole 22 is measured either by a potentiometer or, as shown in FIG. 5, by a high impedance volt meter, such as a Dymec digital volt meter, through the two remaining legs 16*b* and 18*b***. It should be noted that the stripe resistances or probe contact resistance do not matter in this measurement.

The technique involved in the formation of the test specimen, as described hereinabove, was simplified in that a test specimen simply directed to the measurement of a single interface resistance between two levels of metal layers was being considered. However, the principle of this technique may be extended to the measurement of plural interfaces existing at many different levels of metallurgy.

As shown in FIG. 6, the complete series of steps is outlined whereby a process of forming conventional devices, and concurrently of forming the required test specimens is performed. In such a procedure as detailed by the steps shown in FIG. 6, "via" holes are created between a number of metal layers at respectively different levels. The substrates are, as before noted, 1¼ inch diameter silicon wafers and, as indicated in the first step of the series of steps in FIG. 6, are wafers which have been oxidized, that is, have had a silicon oxide layer formed on them having a thickness of approximately 6000 Angstroms. After application of the buffer etch which has a composition of 10:1 $NH_4F$ mix:HF solution, the first level of metallurgy is applied. Because of the necessity to etch fine lines in this first level of metallurgy and to avoid aluminum penetration into the silicon during subsequent heating operations, 5000 Angstroms of aluminum and Al-3% Si are used. The techniques used to deposit the 4000 Angstroms of Al-Si solid solution alloy may be used in various operations and are essentially schemes for achieving the same result. The "flash evaporation" technique has the advantage of assuring a more homogeneous deposit of Si through the aluminum matrix by virtue of overcoming the difference in vapor pressures of aluminum and silicon.

The next step, that is, step 4 in the flow diagram of FIG. 6, is a subtractive etch step. This step involves a technique known to those skilled in the art for removing all of the deposited metal except in the selected pattern that the conductors are to take. In the case of the test specimen itself, the pattern is in the form of an L as previously noted. After the subtractive etch a sintering heat treatment is carried out (step 5). This step is necessary following the aluminum deposition because the 200° C. substrate temperature used during the aluminum deposition step is inadequate to establish a low resistance ohmic contact. Therefore, it is necessary to employ the subsequent heat treatment to sinter the interface. The required temperature varies in different operations from 450° C. to 525° C. In one run 500° C. for 15 minutes in $O_2$ was used. The $O_2$ is used to further assure photoresist removal, but is not considered necessary.

In accordance with step 6, the first insulation layer of quartz is applied, which can be accomplished by a number of known deposition processes. Following such quartz layer formation a photoresist procedure is carried out in order to etch the small "via" holes in the quartz layer (step 7). A conventional KTFR photoresist is used and normal exposure of the photoresist layer and development of same is performed. In removing the KTFR, after etching the required holes, it is usually found that some residues from post-etching preparations are left on the quartz. To take care of this, buffered HF etching is effective to remove such residues (step 8), thereby assuring good adhesion of the next level of metallurgy to the quartz.

The next 6 steps, that is, steps 9 through 14 are essentially repeates of steps 3–8, and therefore no further detailed description is provided. However, it should be noted that because of the remoteness of the second level metallurgy from the contact holes, it is suggested that pure aluminum could be used instead of the Al-Si alloy. Also, the topography of the first level quartz and the 1.5 micron deep "via" holes require thicker second level metallurgy. Therefore, one micron of pure aluminum is used.

Finally, a trimetal deposit of Cr-Cu-Au is laid down. This trimetal deposit serves as a solderable external spot to connect to the second level aluminum metallurgy.

An alternative embodiment of the technique of the present invention is directed to the measurement of the contact resistance between a metal and the semiconductor substrate, typically the contact that is normally made to the base and emitter regions of a transistor. The evaluation of the effects of various aluminum evaporation conditions on these transistor contacts is undertaken using the same previously described structure, that is, a test device in the form of contacting, generally L-shaped, layers to measure the potential drop at the aluminum-silicon interface. It will be appreciated that, although specific evaporation processes will be elaborated on, that the procedure to be described is not limited to these particular processes.

Figure 7:
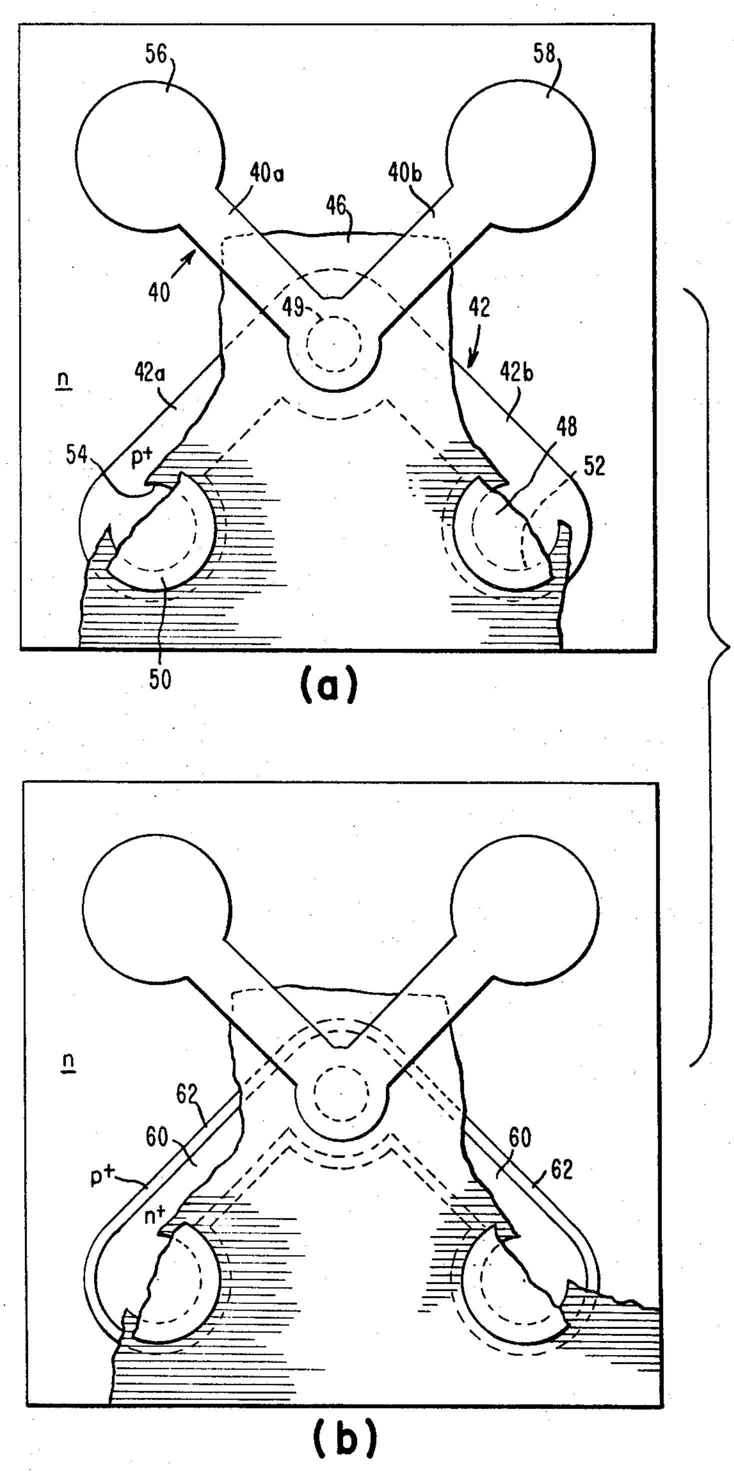
FIG. 7 is a top view of another embodiment of the invention, illustrating a test device for measuring the contact resistance in the case of (a) base contact formation and (b) emitter contact formation.

FIG. 7 illustrates several test specimens, for the testing of base contact resistance as in FIG. 7*a*, and of emitter contact resistance as in FIG. 7*b*. These specimens are formed using the regular transistor diffusion and reoxidation operations. Thus, two L-shaped configurations are formed, one of the configurations being similar to the metal L-shaped layer 16 in the first embodiment (FIG. 2). This metal layer is designated 40. The other L-shaped configuration 42 comprises a layer of semiconductor material at the surface of the substrate and having the same characteristics that the base region of a typical transistor would have. Thus, the lower L is delineated by the junction between the N-type substrate and P-type layer. The "test" base region is formed by the standard masked diffusion operations in this general shape in order that the contact resistance to all the base regions may be correctly monitored. At its apex the layer 40 makes contact through a hole 44 in the oxide layer 46 to the apex of the L-shaped semiconductor region 42. Auxiliary contacts for permitting probe contact to the semiconductor layer 42 are made at the extremities thereof in the form of the dots 48 and 50. These dot contacts, of course, reach through the oxide layer 46 by way of holes 52 and 54. The specimen is tested, as before, such as by putting current through diagonally opposite legs **40*a* and 42*b*. The voltages are measured across the remaining pair of legs 40*b* and 42*a* with a high impedance digital volt meter. This is essentially a 4-point probe where the potential probes assume the potentials of the material just above and just below the aluminum-silicon interface. Two probes, one of which is connected to a high impedance voltmeter and the other to a constant current power supply, are placed on the layer 40 at the extremities thereof, that is, at the circular portions 56 and 58, and the other two probes are, of course, placed in contact with the metal dots 48 and 50**. In this procedure some uncertainties are to be expected since the current must "separate" under the contact, perhaps inducing some potential drop in the voltage measuring arm. This however would be a fixed resistance in series with the contact resistance, and represents a minimum level of sensitivity.

At another place on the substrate an emitter contact resistance measuring device is formed as shown in FIG. 7*b*. The emitter contact pattern is essentially the same as the base contact pattern previously shown in FIG. 7*a*, except that here the configuration for the emitter itself, that is, the L-shaped configuration 60, is formed within the already formed larger base configuration 62. As before, contact is made from a metal layer at the top surface of the substrate through a hole in the oxide down to the emitter configuration 60. Also, as before, contact is made to the extremities of this emitter configuration 60 through suitable holes.

The contact resistance of various metal-silicon contacts have been provided before in the literature, for example, in an article by R. C. Hooper, J. A. Cunningham and J. G. Harper, "Electrical Contacts to Silicon," Solid State Electronics Vol. 8, pp. 831–833 (October 1965). Measurements given there were made by plotting potential profiles on sections of metal-silicon-metal sandwiches and extrapolating to the junction. Using their data for aluminum contacting uniformly doped p-type material of .005 ohm-cm. and .05 ohm-cm. resistivity, one can interpolate linearly to get the contact resistance for .01 ohm-cm. ($1.0\times10^{19}$ atoms/cm.$^3$) material which most nearly represents the situation in the transistor of concern here (base region, $C_o\sim1\times10^{19}$ atoms/cm.$^3$). This value is about $1.04\times10^{-4}$ ohm-cm.$^2$. The area of the contact on the device of FIG. 7 is $2.02\times10^{-5}$ cm.$^2$. Calculating the resistance to be expected, then, one gets 5.15 ohms. The lowest measured resistance which has been observed on a device is about 3.8 ohms, which is in fair agreement with the above calculation but much more simply achieved. A similar comparison for the emitter contact is not available since the available data for N-type material is not close enough to the resistivity range of interest.

In accordance with the technique of the present invention a single large batch of wafers was prepared by oxidation, diffusion, and photoresist steps using standard transistor processing. The important specifications for the test device are tabulated below.

Figure 8:
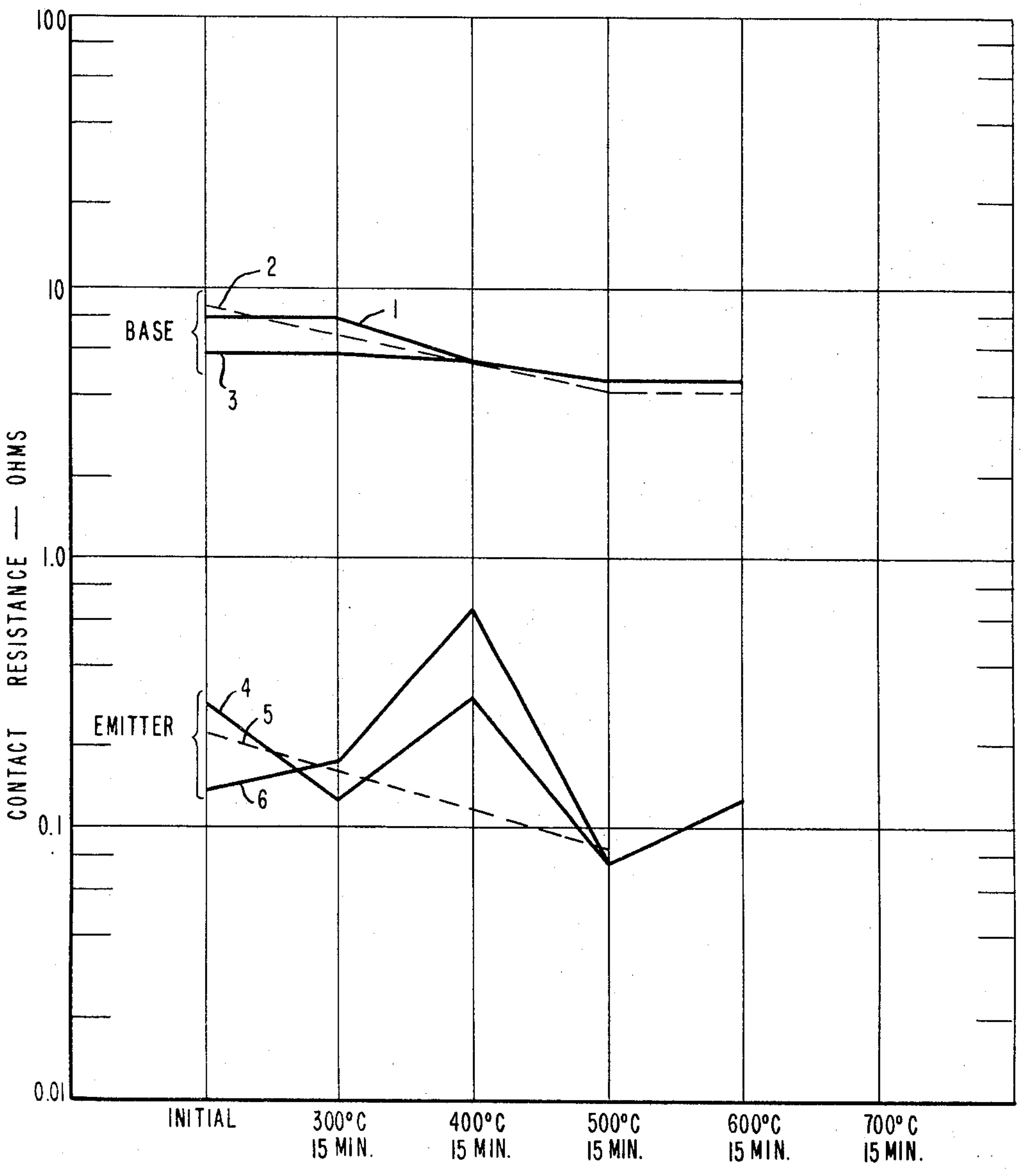
FIG. 8 is a typical plot of contact resistance obtained for various heat treatments.

(1) Collector resistivity: .24–.30Ω-cm. N epi (2) Base diffusion (after reoxidation):

(a) $C_o=1\times10^{19}$ cm.$^{-3}$
(b) Sheet resistance=145Ω/□
(c) Junction depth=.078 mil (3) Emitter diffusion (after reoxidation):

(a) $C_o=7.5\times10^{20}$
(b) Sheet resistance=5.0Ω/□
(c) Junction depth=.066 mil All the wafers were given a standard buffer HF etch prior to the deposition of the metal layer, which was constituted of aluminum as one example. The wafers were subtractively etched after the aluminum deposition to obtain the contact pattern. Wafers were measured at 10 ma. of test current after suitable heat treatment. Typical results are shown in FIG. 8. where resistance is plotted against various heat treatments. FIG. 8 shows the results of a high production evaporation in which the substrates and a single source are outgassed rather thoroughly prior to evaporation of pure aluminum. As will be seen from FIG. 8, base resistances are very low, being below 10 ohms initially and being brought down to 4–5 ohms at 500° C. The contact resistance holes (hole 44, for example, in FIG. 7*a*) were approximately 2.0 mils in diameter. As will also be seen from FIG. 8, the emitter resistances are extremely low and have values of about 0.1 ohm with heat treatment.

What has been disclosed is a simple and effective control technique and a device associated therewith for continuously monitoring interface resistances as they are produced in the manufacture of integrated circuits. This technique has been shown as applicable to both the case of measuring contact resistance between metal layers and also between a metal conductor and an active region of a semiconductor device, as that device is fabricated in an integrated circuit context.

The test specimen or device of the present invention can give one an immediate indication as to the probabilities of success in the attempt to obtain high yield in integrated circuit production. One of the principal advantages of this tool is that the uncertainty due to probe contact voltage drops is eliminated.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a process of fabricating an integrated circuit assembly comprising a semiconductor substrate having a protective insulating coating on one surface of the substrate and a plurality of active device regions formed within said substrate with metal conductors interconnecting said regions, the technique of forming concomitantly a test specimen for testing interface resistances between conductive layers existing at different levels of said assembly, comprising forming two conductive layers which make contact to each other through an opening in an insulator, making probe contacts to the extremities of one of the two legs formed by each of said conductive layers.

2. In a process as defined in claim 1, wherein the technique comprises forming each said conductive layer in a generally "L" shape.

3. In a process as defined in claim 2, wherein the technique comprises forming one of said layers as a semiconductive layer at the surface of said substrate by penetration of a suitable impurity therein.

4. In a process as defined in claim 2, wherein the generally L-shaped conductive layers are formed as metal layers at different levels above the substrate for testing contact resistance between metal layers.

5. In a process as defined in claim 4, wherein the metal layers are constituted of aluminum.

6. In a process as defined in claim 4, wherein the insulator between metal layers is constituted of quartz.

7. In a process as defined in claim 1, wherein the test device is formed simultaneously with the active device regions.

8. A technique of testing interface resistance under substantially identical process conditions as are operative in producing integrated circuit assemblies including forming at least one metal layer over a protective insulating coating on a semiconductor substrate, subtractively etching the metal layer so formed to leave a conductive patterns above the coating comprising, forming conductive layers at two different levels with an insulating layer between, said conductive layers each having two legs and contacting each other at an opening in the insulating layer, connecting the extremities of a leg at the first level and a leg at the second level to a voltmeter and the extremities of the remaining legs to a constant current power source whereby the interface resistance is effectively determined.

9. A technique as defined in claim 8, further comprising forming each of said conductive layers in a generally L shape.

10. A technique as defined in claim 9, comprising forming one of said conductive layers as a semiconductor layer at the surface of said substrate by penetration of a suitable impurity therein.

11. A technique as defined in claim 9, wherein the generally L shaped conductive layers are formed as metal layers at different levels above the semiconductive substrate for testing contact resistance between metal layers.

12. A technique as defined in claim 11, wherein the metal layers are constituted of aluminum.

13. A technique as defined in claim 11, wherein the insulator between metal layers is constituted of quartz.

14. A technique as defined in claim 8, wherein the test device is formed simultaneously with active devices.

References Cited

UNITED STATES PATENTS

| | | | |
|---|---|---|---|
| 2,746,121 | 5/1956 | Anderson | 29—574 X |
| 2,974,262 | 3/1961 | Abraham | 29—574 X |

WILLIAM I. BROOKS, *Primary Examiner.*